(12) United States Patent
Simmons (10) Patent No.: US 8,977,976 B2
(45) Date of Patent: Mar. 10, 2015

(54) SYSTEMS AND METHODS FOR AUTOMATED AVAILABILITY AND/OR OUTAGE MANAGEMENT

(75) Inventor: Karl A. Simmons, Oakland, CA (US)

(73) Assignee: Gridspeak Corporation, Oakland, CA (US)

( * ) Notice: Subject to any disclaimer, the term of this patent is extended or adjusted under 35 U.S.C. 154(b) by 0 days.

(21) Appl. No.: 13/879,014

(22) PCT Filed: Oct. 13, 2011

(86) PCT No.: PCT/US2011/056224
§ 371 (c)(1),
(2), (4) Date: May 31, 2013

(87) PCT Pub. No.: WO2012/051460
PCT Pub. Date: Apr. 19, 2012

(65) Prior Publication Data
US 2013/0263035 A1    Oct. 3, 2013

Related U.S. Application Data

(60) Provisional application No. 61/393,830, filed on Oct. 15, 2010.

(51) Int. Cl.
G06F 3/0481 (2013.01)
H02J 3/14 (2006.01)
H02J 13/00 (2006.01)

(52) U.S. Cl.
CPC ............... *G06F 3/0481* (2013.01); *H02J 3/14* (2013.01); *H02J 13/0079* (2013.01); *Y02B 70/3225* (2013.01); *Y04S 20/222* (2013.01)

USPC ........... 715/772; 715/771; 715/764; 700/286; 700/291

(58) Field of Classification Search
CPC .............................. G06F 3/0481; G06F 9/4443
USPC ......................................................... 715/772
See application file for complete search history.

(56) References Cited

U.S. PATENT DOCUMENTS 5,659,768 A * 8/1997 Forbes et al. ................. 715/201
5,914,673 A * 6/1999 Jennings et al. ......... 340/870.03

(Continued)

FOREIGN PATENT DOCUMENTS

EP        2081273 A2    7/2009
JP     2002/218650 A    8/2002

OTHER PUBLICATIONS

International search report and written opinion dated Apr. 25, 2012 for PCT/US2011/056224.

*Primary Examiner* — Reza Nabi
(74) *Attorney, Agent, or Firm* — Wilson Sonsini Goodrich & Rosati (57) ABSTRACT

Systems and methods are provided for instantly and electronically reporting generation outages and/or availability to the grid operator. More specifically, the invention relates to systems for creating outage requests on a mobile device or web interface, accepting outage requests, processing the outage request, submitting the outage request to the grid operator electronically, receiving and communicating acknowledgement of receipt, acceptance or rejection of the outage request and starting the outage when an outage request is approved. In some embodiments, workflow design for processing the outage request may occur on a mobile device or web interface.

19 Claims, 3 Drawing Sheets

(56) References Cited

U.S. PATENT DOCUMENTS

| | | | |
|---|---|---|---|
| 6,058,355 A * | 5/2000 | Ahmed et al. | 702/62 |
| 6,122,603 A * | 9/2000 | Budike, Jr. | 702/182 |
| 7,010,437 B2 * | 3/2006 | Lubkeman et al. | 702/58 |
| 7,155,720 B2 * | 12/2006 | Casati et al. | 718/104 |
| 7,305,281 B2 * | 12/2007 | Scott et al. | 700/286 |
| 7,516,106 B2 * | 4/2009 | Ehlers et al. | 705/412 |
| 7,542,428 B1 * | 6/2009 | Johnson et al. | 370/241 |
| 7,697,926 B2 * | 4/2010 | Brown et al. | 455/419 |
| 7,797,179 B2 * | 9/2010 | Chakraborty et al. | 705/7.12 |
| 7,961,740 B2 * | 6/2011 | Flammer et al. | 370/400 |
| 2004/0102873 A1 | 5/2004 | Stark et al. | 700/286 |
| 2004/0133876 A1 * | 7/2004 | Sproule | 717/105 |
| 2006/0114121 A1 * | 6/2006 | Cumeralto et al. | 340/870.02 |
| 2007/0143736 A1 * | 6/2007 | Moriarty et al. | 717/100 |
| 2007/0165835 A1 * | 7/2007 | Berkman | 379/399.01 |
| 2007/0198099 A9 * | 8/2007 | Shah | 700/1 |
| 2008/0097782 A1 * | 4/2008 | Budike, Jr. | 705/1 |
| 2008/0127063 A1 * | 5/2008 | Silva et al. | 717/107 |
| 2008/0201702 A1 * | 8/2008 | Bunn | 717/171 |
| 2008/0231114 A1 * | 9/2008 | Tolnar et al. | 307/38 |
| 2008/0272934 A1 * | 11/2008 | Wang et al. | 340/870.11 |
| 2009/0034419 A1 * | 2/2009 | Flammer et al. | 370/238 |
| 2009/0070187 A1 * | 3/2009 | Webster | 705/10 |
| 2009/0089471 A1 * | 4/2009 | Barros | 710/260 |
| 2009/0109056 A1 * | 4/2009 | Tamarkin et al. | 340/870.02 |
| 2009/0125351 A1 * | 5/2009 | Davis et al. | 705/7 |
| 2009/0187284 A1 * | 7/2009 | Kreiss et al. | 700/291 |
| 2009/0237363 A1 * | 9/2009 | Levy et al. | 345/173 |
| 2009/0287739 A1 * | 11/2009 | Zhang et al. | 707/104.1 |
| 2010/0049472 A1 * | 2/2010 | Keefe et al. | 702/182 |
| 2010/0106546 A1 * | 4/2010 | Sproule | 705/7 |
| 2010/0248661 A1 * | 9/2010 | Bullock | 455/127.1 |
| 2011/0270550 A1 * | 11/2011 | Kreiss et al. | 702/60 |
| 2012/0072142 A1 * | 3/2012 | Keefe et al. | 702/60 |
| 2012/0200423 A1 * | 8/2012 | DiLuciano et al. | 340/870.01 |
| 2012/0200426 A1 * | 8/2012 | DiLuciano et al. | 340/870.07 |
| 2012/0203388 A1 * | 8/2012 | DiLuciano et al. | 700/292 |
| 2013/0036311 A1 * | 2/2013 | Akyol et al. | 713/189 |
| 2013/0038468 A1 * | 2/2013 | Wang et al. | 340/870.02 |
| 2013/0057413 A1 * | 3/2013 | Tamarkin et al. | 340/870.02 |
| 2013/0263035 A1 * | 10/2013 | Simmons | 715/772 |
| 2013/0339922 A1 * | 12/2013 | Sproule | 717/103 |
| 2013/0342358 A1 * | 12/2013 | Kardos et al. | 340/870.02 |

* cited by examiner

SYSTEMS AND METHODS FOR AUTOMATED AVAILABILITY AND/OR OUTAGE MANAGEMENT

CROSS-REFERENCE

This application claims the benefit of U.S. Provisional Application No. 61/393,830, filed Oct. 15, 2010, which application is incorporated herein by reference in its entirety.

BACKGROUND OF THE INVENTION

In some situations, it may be desirable to plan power outages, and generation facilities may provide selected planned outages. Outages may be planned to allow maintenance to be performed on existing equipment or implement the installation of new equipment. Alternatively, unplanned outages may occur. Outages may result from equipment failure within the power system. Traditionally, generation facilities report power generation outages to the grid operator by telephone. An increasing number of generation facilities also rely on third-party service companies to manage outage requests manually acting as a go-between the grid operator and the generation operator. Such procedures are slow and cumbersome.

Therefore, a need exists for improved systems and methods for automating reporting generation outages and/or availability. A further need exists for systems and methods for electronically reporting generation outages and/or availability to a grid operator through an interface.

SUMMARY OF THE INVENTION

The invention relates to systems and methods for instantly and electronically reporting power generation outages and/or availability to a grid operator or others. More specifically, the invention relates to systems and methods for creating outage requests on a mobile device or web interface, accepting outage requests, processing the outage request, submitting the outage request to the grid operator electronically, receiving and communicating acknowledgement of receipt, acceptance or rejection of the outage request and starting the outage when an outage request is approved.

Methods and systems of automating an availability and/or outage management process may be provided in accordance with aspects of the invention. Systems and methods for automated availability and/or outage management for wholesale electricity markets may be provided. An automated, outage management system may have a workflow engine supplied with a data dictionary and a set of rules which the workflow engine may use to process outage request, submit outage requests to the grid operator, communicate approved or unapproved power outages and/or availability to counter-parties, or file forced outage and availability reports as required by tariff guidelines. Generation operators may configure outage criteria within the workflow engine relative to their generation facility operating and contract guidelines. The workflow engine may evaluate generated outage requests and deliver the requests to the grid operator. The workflow engine may also retrieve the response electronically and post the response to all counter-parties within seconds. The workflow engine may permit generation owners to configure tasks within the workflow to be automatic, conditional, timed, or act in accordance with any set of predetermined rules. The workflow engine may permit scheduling of power outages. See, e.g., U.S. Patent Publication No. 2009/0287739, which is hereby incorporated by reference in its entirety.

An aspect of the invention is directed to an automated availability and/or outage management system comprising a workflow designer hosted on a device with a display, wherein the workflow designer is configured to accept a user input via a graphical interface shown on the display; and a workflow engine in communication with the workflow designer over a network, wherein the workflow engine is configured to process the user input in accordance with one or more workflow rules, and wherein the workflow engine is configured to communicate power availability and/or outage related information with a grid operator.

An additional aspect of the invention may provide a method for automated availability and/or outage management, said method comprising: providing a management system comprising a processor and a memory, wherein the management system is configured to store one or more availability and/or outage task within the memory; accepting, at the management system, a workflow rules input and outage information; and providing, from the management system, one or more outage request, wherein said outage request is generated using the processor of the management system based on the workflow rules input and the outage information.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for automating an availability and/or outage management and reporting process in accordance with aspects of the invention. Various aspects of the invention described herein may be applied to any of the particular applications set forth below or for any other types of power management system. The invention may be applied as a standalone system or method, or as part of a service, tool, or electricity management package. It shall be understood that different aspects of the invention can be appreciated individually, collectively, or in combination with each other.

Figure 1:
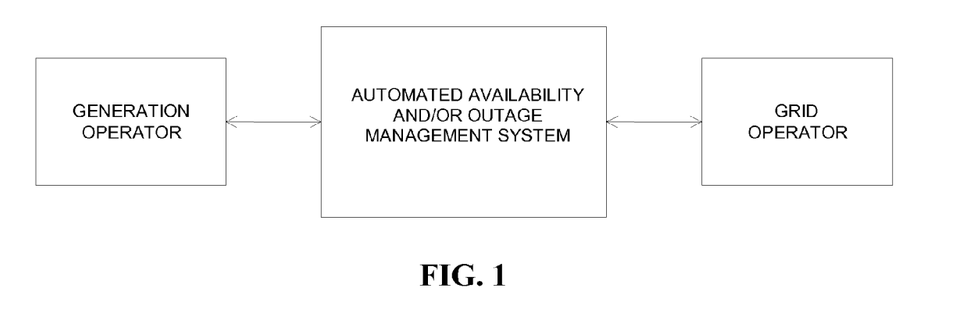
FIG. 1 shows an automated availability and/or outage management and reporting system in communication with a generation operator and a grid operator.

FIG. 1 shows an automated availability and/or outage management system in communication with a generation operator and a grid operator. The automated availability and/or outage management system may receive input from a generation operator who may be interacting with an interface of the automated availability and/or outage management system. In some embodiments, the input may be an outage request and information associated with the outage request. The automated availability and/or outage management system may automatically process the outage request in accordance with one or more sets of rules. The rules may be predetermined. Based in the processing, the automated availability and/or outage management system may provide a power outage request to a grid operator.

Any description herein of an automated outage management system may apply to an automated availability and/or outage management system, and vice versa.

In some embodiments of the invention, the automated outage management system may automatically receive an outage input from a generation operator and send an outage request to a grid operator according to a set of predetermined rules without requiring user interaction. The predetermined rules may include determining power generation availability. The outage management system may accept a user input that may be incorporated into processing of an outage input. In some embodiments, the automated management system may accept a user input that may alter the predetermined rules.

In some embodiments, the automated management system may be in communication with one or more sensor that may provide input that may be incorporated into the processing of an outage input. One example of such a sensor may include a utility meter. In some embodiments, the utility meter may indicate if an outage has occurred, thereby providing automated outage detection. Alternatively, the utility meter may indicate generation status, level, or trends. The utility meter may provide an indication of availability. The automated management system may directly communicate with utility meters, monitoring generation data processing gateways, or meter data management systems on a pre-configured interval or as directed by user parameters. Such data may be collected, processed and delivered to relevant parties.

In some embodiments, an outage input may be provided by a user, or may be provided by a utility meter or other sensor. In some instances, a user may input a planned outage, and a utility meter may indicate an unplanned outage.

In some embodiments, power may be generated by electromechanical generators, which may be primarily driven by heat engines fueled by chemical combustion or nuclear fission. Power may also be generated by renewable energy sources. Some examples of renewable energy sources may include kinetic energy from flowing water and wind. Other examples of renewable energy may include solar photovoltaics, solar thermal, and geothermal power. In some embodiments, renewable sources of energy may result in intermittent outages. For example, wind flow may be unpredictable, or energy from the sun may depend on time of day or weather. Planned, predicted, or unplanned outages may occur for various power generation systems. The automated outage management system may interact with different power generation systems, and accordingly manage various types of outages. For example, the automated outage management system may detect intermittent outages and may immediately respond to situations specific to their generation (resource) type. The automated outage management system may detect availability of power generation systems and manage outages based on availability.

Figure 2:
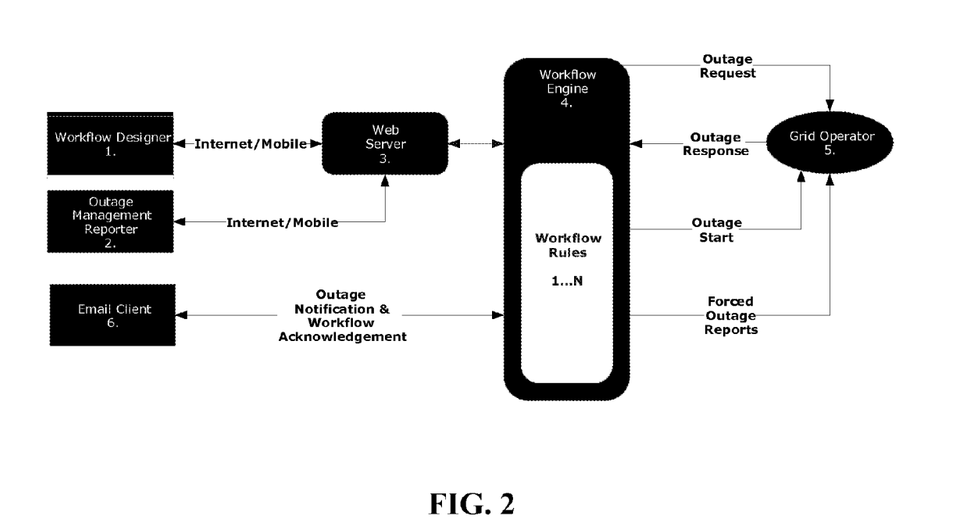
FIG. 2 illustrates an automated availability and/or outage management system in accordance with an embodiment of the invention.

FIG. 2 illustrates an automated availability and/or outage management system in accordance with an embodiment of the invention. The automated availability and/or outage management system may comprise a workflow designer (1), an outage management and reporting interface (2), a web/application server (3), and a workflow engine (4). The workflow engine or system (or portions thereof) may communicate electronically with grid operator systems (5) via one or more web/application servers as described elsewhere herein. The workflow engine may be in communication with an email client (6). The workflow designer and availability and/or outage management and reporting interface may communicate with and/or reside on the web server. The web server may communicate with the workflow engine.

In some embodiments, power generation outages may be planned or scheduled. In some embodiments, a workflow designer (1) may provide a web or mobile interface for operations to indicate scheduled outage and current status of generation. Examples of generation status may include on, off, or modified. The generation and outage status may depend on workflow parameters. In some embodiments, the workflow designer may assist with the scheduling of an outage. Any user interface may assist with scheduling an outage. See, e.g., U.S. Patent Publication No. 2009/0287739, which is hereby incorporated by reference in its entirety. One or more tasks relating to generation/outage status may be carried out automatically without user intervention in an automated availability and/or outage management system.

A generation operator may interact with the automated availability and/or outage management system. In some embodiments, the generation operator may optionally design rules for workflow. The generation operator may also optionally provide availability and/or outage information. For example, if an outage is planned, the generator may provide information relating to the planned outage. The generation operator may interact with a workflow designer (1) of the automated availability and/or outage management system.

The workflow designer (1) is an administration tool that may design rules for workflow. The workflow designer may be used by one or more generation operators to customize workflow parameters, define checklists and define criteria for outage management processes within the workflow engine (4). The workflow designer may reside on the web/application server (3). Alternatively, the workflow designer may reside on any computer or other network device in the network communication with the web/application server. In some embodiments, the workflow engine may reside on the web/application server. Alternatively, the workflow engine may reside on any computer or other network device in network communication with the web/application server.

Network devices may include computers whether they be a personal computer, server computer, or laptop computer; mobile devices, such as a tablet, personal digital assistants (PDAs) such as a Palm-based device or Windows CE device;

phones such as cellular phones, smartphones (e.g., iPhone, BlackBerry, Android, Treo); a wireless device such as a wireless email device or other device capable of communicating wirelessly with a computer network or other communication network; or any other type of network device that may communicate over a network and handle electronic transactions. Any discussion herein of computers or mobile devices may also be applied to any other network devices as provided.

A computer or other network device may communicate with the web server. The communication between a network device and a web server may be, for example, a connection between a client computer and a website server over a network. One or more servers may communicate with one or more computers or other network devices across a network. The network, for example, can include a private network, such as a LAN, or interconnections to the online organizations over a communications network, such as the Internet or World Wide Web or any other network that is capable of communicating digital data, such as a wireless, cellular, or telecommunications network. Each computer or other network device may connect to one or more web server over the network using data protocols, such as HTTP, HTTPS and the like. In a preferable embodiment, the workflow designer may reside on a computer separate from the web/application server that is on the same LAN as the web/application server.

Generally, the workflow designer (1) may provide an object-based, graphical interface modeling the individual tasks required to complete a task within the outage management process. A user, such as a generation operator, counterparty, or any other party, may interact with a server, computer, mobile device (e.g., tablet, smartphone) or other network device that may host the workflow designer. When a computer or other network device is communicating with the web server, the device may have a processor and a memory that may store an operating system (OS) and a browser application or other application to facilitate communications with the web server. For example, the operating system may operate to display a graphical user interface to the user and permit the user to execute other computer programs, such as the browser application. The browser application, such as Microsoft Internet Explorer, Mozilla Firefox, when executed by the processor, permits the user to access the World Wide Web as is well known. Similarly, other applications or "apps" on mobile devices may be used. A server, computer, or other network device that may host the workflow designer may have a display which displays a graphical user interface. Any display known in the art may be used including, but not limited to, a cathode ray tube, a liquid crystal display, a plasma screen, a touchscreen, an LED screen, or an OLED display.

Each task within the availability and/or outage management process may be an individual piece of work that may occur to complete a process. Tasks may be completed by a person, may be automated, may be completed automatically through the passage of time, or may be conditioned on additional information. Tasks may also be a combination of timed and some other type, such as "person timed" or "automated timed." In some instances, one or more tasks may be automated without user intervention.

One or more tasks may occur to a set of workflow rules. The rules may dictate when a user performs one or more steps, or when a machine automatically performs one or more steps. The rules may be based on timing, sequence, results from prior tasks, automatically received information, or inputs from users. The tasks may be executed by a person or by one or more computer. The computer or other network device may have one or more processors and memory may include non-transitory and/or tangible computer readable media which may contain instructions, logic, data, or code that may be stored in persistent or temporary memory of the computer or other device, or may somehow affect or initiate action by the computer or other device. All tasks may be conditionally started using selection criteria. In some embodiments, the tasks may be involved with confirming, scheduling, or executing power outages.

The workflow designer (1) may also collect information, such as who is requesting an outage, details associated with the outage, such as location, degree, and timing. The workflow designer may optionally include information collected from one or more meter that may monitor power levels or flow. The workflow designer may provide a list of outage requests and/or may prioritize the outage requests. The workflow designer may schedule the outage requests or adjust timing or location of the outage requests.

In some embodiments, the workflow designer (1) rules may be predefined to following regulations. In some embodiments, workflow designers may be provided to or accessed by one or more entity. An entity may be a company, organization, institution, energy provider, or power generator. In some embodiments, workflow designers provided to all entities may meet regulations. In some embodiments, each entity may further define the rules or selection criteria to meet the entity's needs. For example, if multiple companies receive the workflow designer, the workflow designer may be designed to meet corporate policies. In another example, the regulations may be determined by a governmental body or regulatory authority. The workflow designer may be designed to meet government or industry standards.

The workflow engine (4) may use selection criteria to evaluate all outage requests and outage start requests and may render decisions as to whether or not to start a task. All tasks may be completed in a sequence defined by a checklist. Roles, performers, operators and other entities defined using the workflow designer (1).

The workflow designer (1) may utilize an object based representation of the internal software processes to allow for modification of the workflow process after the workflow engine (4) is compiled and installed. Furthermore, the object-based workflow designer (1) may permit dynamic alterations to the workflow engine (4), such that the entire workflow process may be re-ordered or the steps rearranged without restarting the web/application server (3) or reinstalling the workflow engine (4). In one example, by simply clicking on a visual representation of a task in the window and dragging the object on the screen, a task may be removed and reinserted into the workflow. Connection arrows may be deleted and reinserted to reorder the workflow process. A graphical user interface may be provided that may allow a user to add one or more task, remove one or more task, or move one or more task within the workflow process. Connection arrows may be added, removed, and/or moved in the workflow process. In some embodiments, such actions may occur by use of any interactive device which may include, but is not limited to, a keyboard, mouse, trackball, stick, remote, touchscreen, or touchpad.

In some embodiments, the visual representation of the tasks may be visually mapped according to a sequence or according to time. In one example, tasks that may occur later in time or sequence may be located toward one end of the display and tasks that may occur earlier in time may be displayed toward the other end of the display. For example, a task that may occur earlier in time or sequence may be at the left of a display and a task that occurs later in time or sequence may be at the right of a display. In another example, a task that may occur earlier in time or sequence may be at the top of a display and a task that occurs later in time or sequence may be at the bottom of a display. In other examples, the location of the visual representation of the task on the display need not have a relationship with the timing or sequence of the task.

A connection arrow or other connecting representation may indicate the order of tasks. In some embodiments, the connector may indicate a relationship between the tasks (e.g., whether they have a conditional relationship or not, or whether information is provided from one task to another).

The workflow process may optionally have a default setting. In some embodiments, the default setting may be the same for all entities that may receive or use a workflow designer. In other embodiments, the default setting may vary between the entities that may receive or use the workflow designer. The default settings may be set according to each entity's preferences. A user may modify the workflow process. In some embodiments, the user may only modify certain parts of the workflow process, or may only modify the workflow process to fit within preset specifications. The default settings or any modifications to the settings may be stored in memory. In some embodiments, they may be stored in the memory of the web server. In some embodiments, they may be stored in the memory of a device hosting the workflow designer, or in the memory of a device hosting the workflow engine.

In some embodiments, the workflow process may be pre-configured, such that each generation operator or counter-party may modify only the parameters within each pre-established task, or each generator operator or counter-party may add and delete specific tasks, control the arrangement of tasks within the workflow process, and modify the parameters. In a preferable embodiment, the workflow checklist (the workflow process as exemplified by the ordered arrangement of task objects) may be customized for each generator operator or counter-party and for each outage type within the operation market. In some embodiments, the workflow engine (4) may process outage requests uniquely for each outage type.

In some embodiments, the workflow engine may process outage requests differently for planned outages and for unplanned outages. Different types of outages may be based on whether the outage is planned or not, intermittent, location of outage, magnitude of outage, timing of outage, duration of outage, or the source or subject of outage. In some embodiments, the parameters and rules may define how the workflow engine processes the outage request for various types of outages.

The outage management reporter (2) is a reporting interface that may report on the status of outage requests and may display information on power availability, past, current or planned outages. The outage management reporter may provide a graphical user interface that may be shown in a display of a device. In some embodiments, the outage management reporter may be hosted by and/or displayed on the same computer or network device as the workflow designer. Alternatively, the outage management reporter may be hosted by and/or displayed on a different computer or network device than the workflow designer. The outage management reporter may alternatively be hosted on the web server. The outage management reporter may be hosted by and/or displayed on the same computer or network device as the workflow engine or a different computer or network device as the workflow engine. In one example, a user may interface with the workflow designer through a computer, which may communicate with a web server, which may communicate with a work flow engine. The workflow engine may perform tasks according to the designed rules.

The web server (3) may accept and send information to be displayed. In some embodiments, the web server may receive configuration and information instructions for the workflow engine. The web server may communicate with the outage management reporter which may display outage information. The web server may communicate with the device hosting the outage management reporter through a network. Any of the connections previously described may be used to permit communication between the web server and the device.

In some embodiments, the outage information may include location, degree, or timing of the outages. The outage information may be displayed as values and/or graphs. The outage management reporter may indicate whether an outage has been approved or not, if or when it is scheduled to happen, or if or when it has already happened, along with details about the outage. The outage management reporter may display generation/outage status to a user. Other relevant information such as power availability may be similarly provided.

A grid operator (5) may have an electronic system managed by the grid operator to receive and respond to outage. In some embodiments, a workflow engine (4) may send an outage request to the grid operator. The outage request may include details about the outage such as geographic location, magnitude, or timing. The grid operator may provide an outage response. In some instances the outage response may be an acceptance or denial of the outage request.

The workflow engine (4) may also provide an outage start signal to the grid operator (5). In some embodiments, the outage start may cause the grid operator to start an outage. In some embodiments, the outage start signal may be provided at a predetermined time. In some embodiments, the outage start signal may be provided if the grid operator previously provided an acceptance of an outage request. The workflow engine may provide forced power outage and/or power availability reports to the grid operator. In some instances, the grid operator may provide feedback to the workflow engine that the outage actually occurred.

In some embodiments the system may include an email client (6). The email client may be a standard email client, or any email client known in the art, where the user can get outage related notification messages from the workflow engine (4) of outage statuses per workflow rules and power availability. The email client may respond to workflow action request through response or inaction. In some embodiments, the user may receive the outage and availability notification messages through a computer, mobile device, or any other network device. In some embodiments, the user may receive the outage and availability notification at the same computer, mobile device, or other network device that may host the workflow designer (1) or outage management reporter (2). In other embodiments, the user may receive the outage and availability notification at a different computer, mobile device, or other network device from the one that may host the workflow designer or outage management reporter.

In some embodiments, the email client (6) may only provide notifications. In other embodiments, the email client may accept a user input to send to the workflow engine (4). In some embodiments, the user input may cause the workflow engine to perform one or more tasks or steps. In some embodiments, one or more tasks may be conditional on the user input. In some embodiments, a user input may alter the workflow engine. In some embodiments, workflow rules of the workflow engine are not affected by user input. In other embodiments, the workflow rules can be altered by the user input. In some embodiments, the email client may request that a user send an acceptance or denial response. In some embodiments, one or more user input or response may be sent to the workflow engine via email. In other embodiments, a user may provide an input or response the workflow engine via any communication channel between the user device and the workflow engine. Such a communication channel may be a network, such as any previously described.

Figure 3:
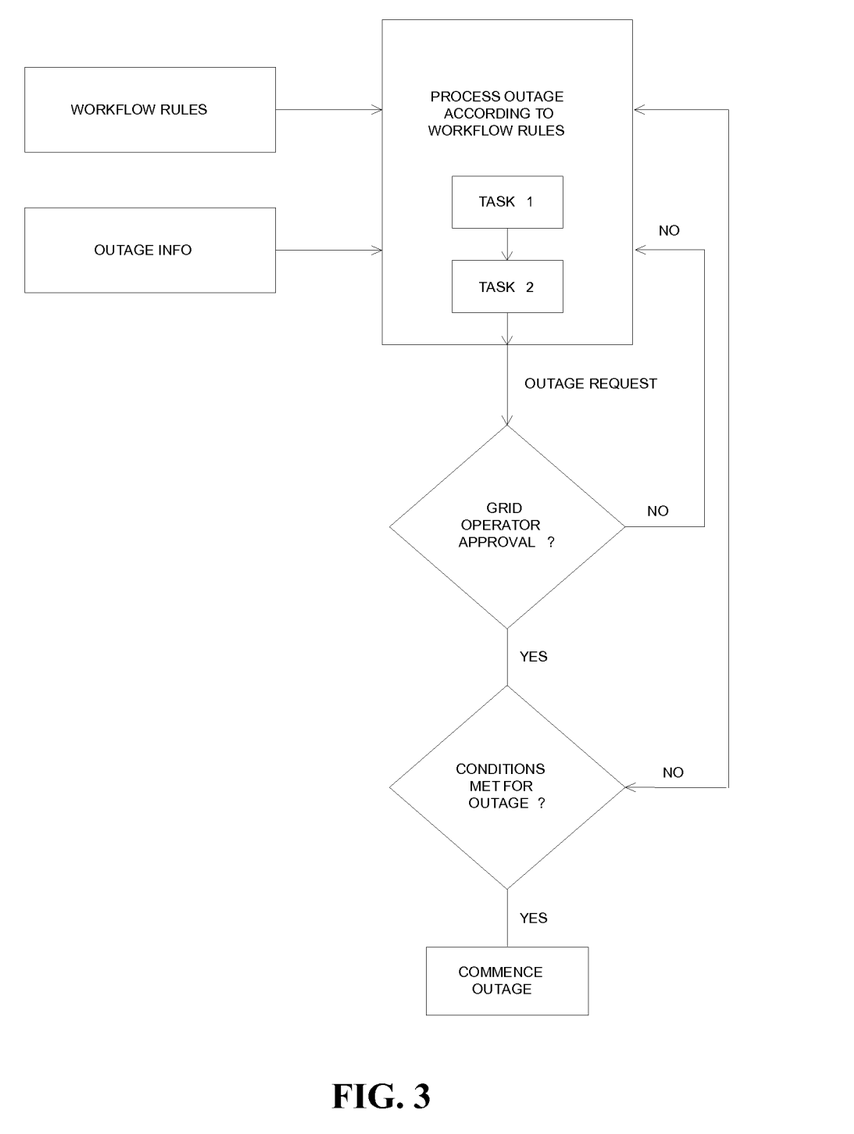
FIG. 3 shows an example of a method for automated availability and/or outage management in accordance with an embodiment of the invention.

FIG. 3 shows an example of a method for automated power availability and/or outage management in accordance with an embodiment of the invention. In some embodiments, workflow rules may be input to an automated availability and/or outage management system. The workflow rules input may include adding, removing, or modifying an existing task in an availability and/or outage management process. For example, Task 1, Task 2, Task 3, . . . may be provided in a sequential order. A user could create a new task, Task 2.5, that may occur between Task 2 and Task 3. A user could remove Task 2 entirely, so that the process goes from Task 1 to Task 3. The user could swap the order of Task 2 and 3, so that the tasks may be performed in order of Task 1, Task 3, and Task 2. A user may modify a task itself, e.g., Task 1, so that the task occurs differently or include different parameters.

Examples of tasks may include but are not limited to: identifying entities likely to be affected by an outage, notifying trade counter-parties of non-delivery, notifying grid operator of changes to availability, and/or filing FERC required reports due to non-availability or outage.

In some embodiments, outage related information may be input to an automated availability and/or outage management system. The outage input may be provided by a user. Alternatively, the outage related information may be received from the grid operator in an automated process without requiring user intervention. In some embodiments, the outage related information may be provided from one or more measuring device, such as a utility meter. The outage related information may be processed according to the outage management process, or one or more tasks of the outage management process.

In preferable embodiments of the invention, an automated availability and/or outage management system may process an outage according to workflow rules. The process may include performing one or more tasks (e.g., Task 1, Task 2, Task 3, . . . ). The tasks may be performed sequentially. Alternatively one or more tasks may be performed in parallel. Tasks may be performed in any combination of sequentially or in parallel.

The automated availability and/or outage management system may communicate with a grid operator. The automated management system may provide and exchange a variety of information with the grid operator related to power outages and availability. For example, the system may submit an outage request to the grid operator. The grid operator may approve or deny the outage request. If the grid operator does approve the outage request, and if conditions for the outage are met, the outage may commence. One or more power generators each having certain output or availability may be powered down for an outage. In some embodiments, power from a generator is not distributed to a particular location or region at a particular time for an outage.

The conditions for outage may be met when one or more task has been performed, or when a predetermined length of time has elapsed, or when a predetermined time has been reached, one or more user input has been provided, one or more environmental conditions (e.g., temperature, weather) have been met, one or more power load level has been reached, or one or more other condition has been met. In some embodiments, time may elapse between approval by a grid operator and meeting the conditions for an outage to commence.

One or more condition sensor may be used to determine whether a predetermined condition has been met. For example, a condition sensor may be a clock that may determine the time. For example, the clock may be used to determine whether a predetermined amount of time has elapsed or been reached. Another example of a condition sensor may be a thermometer, which may determine whether an external or internal temperature has been reached. A condition sensor may be a utility meter which may determine power load or transfer.

In some embodiments, workflow rules, power outage and availability information, or any form of user input may be provided and managed anywhere throughout the aforementioned methods and systems herein. The input may or may not alter the process, or any tasks of the process. The input may or may alter the start or end of the outage, or modify the outage.

Any of the steps may be optional or may be provided in any order. In some embodiments, additional steps may be provided or similar steps may be substituted.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. An automated availability and/or outage management system comprising:
   one or more utility meters;
   one or more power generators;
   a workflow designer hosted on a device with a display, wherein the workflow designer is configured to accept a user input via a graphical interface shown on the display, wherein the user input includes (1) an outage request comprising location of an outage, magnitude of an outage, time of an outage, duration of an outage, or outage type, and (2) an alteration to one or more workflow rules that process the outage request; and
   a workflow engine in communication with the workflow designer over a network, wherein the workflow engine is configured to process the user input that includes the location of an outage, magnitude of an outage, time of an outage, duration of an outage, or outage type, in accordance with the altered one or more workflow rules, and wherein the workflow engine is configured to communicate power availability and/or outage related information with a grid operator,
   wherein said system is configured to monitor the one or more utility meters to sense whether the outage has occurred,
   wherein the one or more power generators are powered down for an outage when the grid operator receives the power availability and/or outage related information and makes a determination to approve an outage request,
   wherein said system displays a connector on the display showing a task corresponding to said availability and/or outage related information, said connector showing an order or a relationship of the task, and wherein the task corresponding to the user is performed automatically with aid of a processor and without requiring human intervention.

2. The system of claim 1 wherein the user input further includes at least one of the following: criteria for an outage management process, or a checklist for an outage management process.

3. The system of claim 2, wherein the workflow designer is pre-configured to follow one or more regulation.

4. The system of claim 1 wherein the power availability and/or outage related information includes one or more of the following: outage request, outage start, or forced outage reports.

5. The system of claim 1 wherein the device is a mobile device.

6. The system of claim 1 wherein the workflow engine is configured to process outages differently according to outage type.

7. The system of claim 6 wherein the outage type has one or more of the following characteristics: planned outage, unplanned outage, intermittency, location of outage, magnitude of outage, timing of outage, duration of outage, source of outage.

8. The system of claim 1 further comprising an outage management reporter configured to display a status of one or more outage requests or information on power availability.

9. The system of claim 1 wherein the grid operator provides feedback to the workflow engine, wherein the feedback is whether an outage requested by the workflow engine has occurred.

10. The system of claim 1 further comprising an email client configured to generate outage related notification messages based on information received from the workflow engine.

11. The system of claim 1 wherein the workflow engine resides on a server in communication with the device over the network, wherein said server comprises a memory and a processor configured to execute one or more steps performed by the workflow engine.

12. The system of claim 1 wherein the system monitors the one or more utility meters and provides an indication of generation status, level, or trends.

13. The system of claim 1 further comprising a plurality of power generators managed by the grid operator, said power generators selected from two or more of the following: generators primarily driven by heat engines fueled by chemical combustion, generators primarily driven by nuclear fission, generators primarily driven by kinetic energy from flower water and wind, generators primarily driven by solar photovoltaics, generators primarily driven by solar thermal power, or generators primarily driven by geothermal power.

14. A method for automated availability and/or outage management, said method comprising:

providing a management system comprising a processor and a memory, wherein the management system is configured to store one or more availability and/or outage task within the memory, and wherein the management system is configured to communicate with one or more utility meters and one or more power generators;

accepting, at the management system, a workflow rules input and outage information, wherein the workflow rules input includes one or more of the following:

adding, removing, or modifying an existing task for processing one or more outage request; and providing, from the management system, the one or more outage request, wherein said outage request is generated using the processor of the management system based on the accepted workflow rules input and the outage information, wherein the management system is configured to communicate the outage request with a grid operator, wherein the management system is configured to monitor the one or more utility meters to sense whether the outage has occurred, wherein the one or more power generators are powered down for an outage when the grid operator receives the outage request and makes a determination to approve the outage request, wherein said management system displays a connector on a display showing a task corresponding to said outage request, said connector showing an order or a relationship of the task, and wherein the task corresponding to the user is performed automatically with aid of a processor and without requiring human intervention.

15. The method of claim 14 wherein the outage information is provided by one or more of the following sources: user, grid operator, or utility meter.

16. The method of claim 14, further comprising determining whether one or more conditions for the outage are met, if the grid operator approves the outage request.

17. The method of claim 16 wherein the one or more conditions are met when one or more of the following occurs: a predetermined length of time has elapsed, a predetermined time has been reached, one or more user inputs have been provided, one or more environmental condition has been reached, or one or more power load level has been reached.

18. The method of claim 14 wherein the workflow rules input and outage information is provided by a generation operator interacting with a workflow designer hosted on a device with a display, via a graphical interface shown on the display.

19. The method of claim 14 further comprising displaying the one or more availability and/or outage task on a display of a device communicating with the memory, wherein the one or more availability and/or outage task is added into a workflow by dragging a visual representation of the task on a screen in the display.

* * * * *